United States Patent
Mays

[11] Patent Number: 6,015,580
[45] Date of Patent: *Jan. 18, 2000

[54] METHOD OF TENDERIZING MEAT

[76] Inventor: Ralph C. Mays, 5436 S. Mingo Rd., Tulsa, Okla. 74146

[*] Notice: This patent issued on a continued prosecution application filed under 37 CFR 1.53(d), and is subject to the twenty year patent term provisions of 35 U.S.C. 154(a)(2).

[21] Appl. No.: 08/678,242

[22] Filed: Jul. 11, 1996

[51] Int. Cl.[7] ................................ A23L 1/318; A22C 9/00
[52] U.S. Cl. .................... 426/281; 426/650; 426/652; 426/442
[58] Field of Search ................................ 426/281, 332, 426/652, 650, 442

[56] References Cited

U.S. PATENT DOCUMENTS

| | | | |
|---|---|---|---|
| 2,043,392 | 6/1936 | Paddock et al. | 99/159 |
| 2,509,299 | 5/1950 | Grom | 99/154 |
| 2,525,581 | 10/1950 | Bierman | 99/271 |
| 2,742,367 | 4/1956 | Bachert | 99/159 |
| 2,881,080 | 4/1959 | Simjian | 99/217 |
| 3,370,959 | 2/1968 | Moore et al. | 99/107 |
| 3,663,233 | 5/1972 | Keszler | 99/107 |
| 4,036,122 | 7/1977 | Langen . | |
| 4,229,458 | 10/1980 | Dreano et al. | 426/281 X |
| 4,818,550 | 4/1989 | Davidson . | |
| 5,057,332 | 10/1991 | Davidson et al. . | |
| 5,200,223 | 4/1993 | Simonsen | 426/281 |
| 5,328,403 | 7/1994 | Long . | |
| 5,679,391 | 10/1997 | Clement et al. | 426/281 |

*Primary Examiner*—Milton Cano
*Attorney, Agent, or Firm*—Head, Johnson & Kachigian

[57] ABSTRACT

Meat tenderization is achieved in a closed vessel in which the meat is placed, the vessel having a liquid medium therein, which may be a marinade, of a depth at least sufficient to cover the meat, and an air passageway port. A vacuum pump is connected to the port and a high vacuum is pulled on the interior of the vessel. While a high vacuum is maintained, the level of vacuum is rapidly cycled. The rapid variation of vacuum serves to tear and disrupt muscle and connective tissue in the meat and to increase absorption of the marinade.

27 Claims, 3 Drawing Sheets

METHOD OF TENDERIZING MEAT

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

This invention is concerned with a method and system for tenderizing meat. A standard technique for improving the flavor of meat is to soak meat before cooking in a marinade. When meat is placed in a liquid marinade, the flavor is enhanced due to the absorption of some of the marinate liquid into the meat. Others have suggested enhancing the effect of marination by including enzymes.

To speed up and to augment the process of the absorption of a marinade by meat, others have suggested placing the marinade in a closed container in which the meat is placed and subjecting the container to pressure—the concept being to utilize fluid pressure to force more of the marinade into the meat. Still others have suggested placing meat in a closed container containing liquid marinade and subjecting the container to a vacuum on the basis that a vacuum will cause the marinade to penetrate more deeply into the meat. U.S. Pat. No. 2,525,581 includes the concept of placing meat in a liquid within a vessel and altering the pressure applied to the meat during a marination process for more effective penetration of the marinade.

While forcing a marinade into meat achieves the goal of improving, or at least changing, the taste of the meat after it has been cooked, marination alone does not dramatically effect how tender the meat will be when cooked.

When the strength of connective tissue is great and of substantial quantity, or the muscle tissue is strong and is not broken down in the cooking process, meat can be "tough", that is, difficult to chew. Accordingly, it has long been an objective of processors of meat to find ways of enhancing the tenderness and the flavor thereof.

Examples of the work done by others to improve the tenderness, texture or flavor of meat are exemplified by the following United States patents:

(a) U.S. Pat. No. 4,818,550 teaches applying a vacuum to draw marination into the meat but does not teach rapid variation of a high vacuum to achieve tenderization;

(b) U.S. Pat. No. 2,043,392 relates to tenderizing meat but in this method a dilute aqueous solution of a proteolytic enzyme is pumped through the vascular system of the meat;

(c) U.S. Pat. No. 2,509,299 relates to a method of preserving food in which the food is placed is a syrup composition including a bleach and subjecting the composition while in the syrup to an elevated fluid pressure and freezing the food while subjected to the elevated pressure;

(d) U.S. Pat. No. 2,881,080 is for tenderizing meat by applying an aqueous enzyme solution and then subjecting the meat to sound wave energy;

(e) U.S. Pat. No. 5,200,223 is a process for treating meat by subjecting the meat to thin jets of liquid to penetrate the meat in which the jets are applied in short bursts; and (f) U.S. Pat. No. 5,328,403 subjects meat to shock waves generated by an explosive charge to tenderize the meat.

While all of these previously disclosed methods of enhancing the tenderness and flavor of meat have merit to one degree or another, nevertheless, none adequately address the problem of economically and expeditiously tenderizing meat by breaking down excessive connective and muscle tissue. Particularly none have taught the concepts to effectively tenderize meat with the opportunity at the same time to marinate the meat to produce a superior flavor when the meat is cooked.

For further background information concerning the treatment of meat, see the following additional United States patents:

| PATENT NO. | INVENTOR | TITLE |
|---|---|---|
| 2,525,581 | Bierman | Apparatus For Treating Food Material |
| 2,742,367 | Bachert | Apparatus and Method For Curing Meats |
| 3,370,959 | Moore et al | Method of Flavoring Poultry Meat |
| 3,663,233 | Keszler | Method of Tenderizing, Curing and Cooking A Meat Product |
| 4,036,122 | Langen | Apparatus For Treating Meat, More Particularly Ham Meat |
| 5,057,332 | Davidson et al | Apparatus and Process For Marinating Foodstuffs |

Of the known prior art references, U.S. Pat. No. 2,525,581 appears to be the most closely related to the present invention.

BRIEF SUMMARY OF THE INVENTION

The invention provides a system for tenderizing meat that has muscle and connective tissue therein and for improved marination. The meat to be tenderized is placed in a vessel that can be sealed. The vessel has a liquid medium therein which can be water or a marinade or a marinade having chemical or enzyme tenderizing agents or other constituents therein.

A high vacuum is applied to the vessel, that is, a vacuum of at least about 25 and preferably about 30 inches of mercury which, as practioners will understand, is close to the maximum economically attainable level of vacuum. After the meat contained within the vessel having a liquid medium therein is subjected to a high vacuum, the level of the high vacuum is sequentially and rapidly varied. As an example, the level of vacuum can be varied rapidly between 25 inches of mercury to 30 inches of mercury, as an example. The range of variation in vacuum should be on the order of at least about 5 inches of mercury. The vacuum level is rapidly varied for a sufficient length of time to tenderize the meat to the desired degree. The amount of time required to achieve a good level of tenderization depends to a great extent upon the nature and character of the meat. Poultry products, and especially chicken, can be tenderized by this process in a relative short time wherein the vacuum is rapidly varied between two high vacuum levels for a relatively few cycles. On the other hand, meat, particularly when derived from an older animal or one that has been fed a poor quality of feed, can take substantially longer, such as much as 5 to 45 minutes.

The preferred rate of vacuum level variation is from about 6 to 20 cycles per minute. The typical meat requires a treatment process of about 10 seconds to about 2 minutes, however, as previously indicated, meat that is considered "tough" may require longer.

During the treatment process, either before or after subjecting the meat to a high frequency of vacuum level changes, and particularly where a marinade is employed that requires time for chemical action with the meat, the meat may be left at a steady state, from about 5 to about 45 minutes to allow a chemical reaction with the meat to augment tenderization and/or flavor.

A better understanding of the invention will be obtained from the following description of the preferred embodiment and claims, taken in conjunction with the attached drawings.

DESCRIPTION OF THE DRAWINGS

FIG. 2 shows the controllable valve positioned so that the interior of the vessel is connected with a vacuum pump and with a reserve vacuum tank to apply maximum vacuum to the vessel in which the meat is contained.

In FIGS. 2 and 3 the arrangement is shown wherein the valve may be automatically actuated by an actuator and shows a timer which is used to time the opening and closing of the multi-port valve to achieve rapidly varying vacuum levels to tenderize the meat within the vessel.

DETAILED DESCRIPTION OF THE PREFERRED EMBODIMENTS

Figure 1:
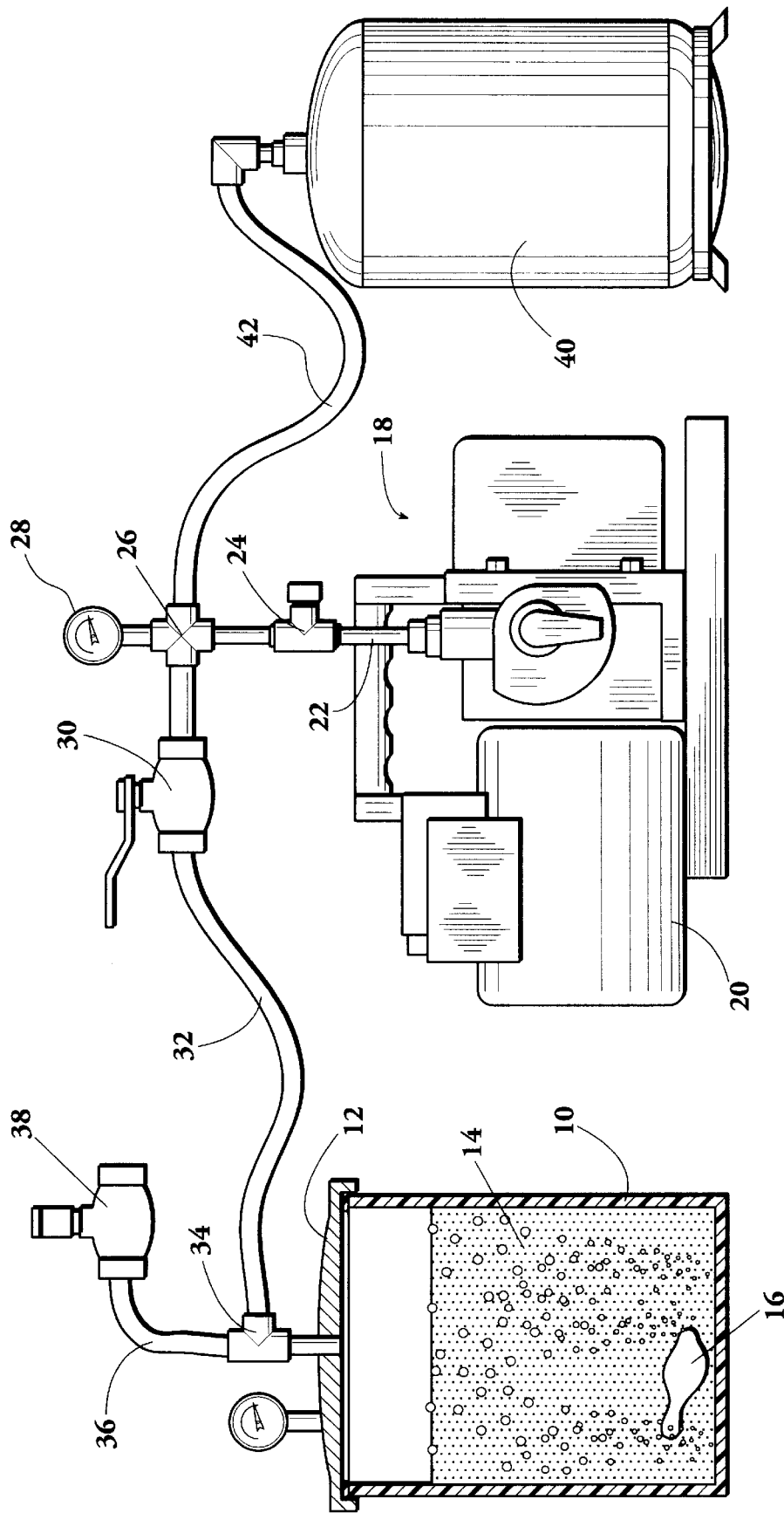
FIG. 1 is a diagrammatic view of a system that can be employed in practicing the invention wherein the system is illustrated in its basic and simplest embodiment and wherein manually operated valves can be used for varying the level of vacuum applied to meat contained within a liquid filled vessel.

FIG. 1 shows the basic apparatus for practicing the method of this invention. A container for receiving meat to be processed is indicated by the numeral 10. The container has a removable cover 12 which, when removed, provides easy access for depositing in the container meat to be processed along with a liquid medium. The liquid medium, indicated by the numeral 14, can be water alone or a marinade, that is, a solution to improve the taste of the meat being processed, or the solution 14 may include chemicals, such as enzymes for augmenting the tenderness of meat or for achieving other characteristics, such as sterilization. The solution 14 can, of course, include a combination of these features so as to marinade as well as otherwise treat the meat in the vessel.

Vessel 10 may be relatively small such as a gallon or two in capacity by which a relatively small quantity of meat is processed at one time, or vessel 10 may be a large vessel that can process simultaneously large quantity of meat, such as, when employed by a meat processing company. Meat treated by the process is exemplified by 16 which shows a single piece of meat, however, the system works irrespective of the number of pieces of meat as long as the meat can be covered by solution 14.

The system includes the use of vacuum and for this purpose a vacuum pump is employed, generally indicated by the numeral 18, powered by a motor 20. When motor 20 is energized to operate vacuum 18, vacuum is produced at the pump outlet 22 and through a check valve 24 the vacuum is applied to a cross fitting 26. The level of the vacuum being indicated by a gauge 28.

Vacuum is fed from fitting 26 through a manually operated valve 30 and conduit 32 which, in the illustrated arrangement, is flexible so as to permit removal of cover 12. Conduit 32 connects to a T-fitting 34 and thus to the interior of vessel 10. A conduit 36 extending from T-fitting 34 to a manual valve 38, one port of which communicates with the atmosphere.

The preferred method of practicing the invention includes a high level of vacuum applied to vessel 10 and varying the vacuum while maintaining a high vacuum level. Accordingly, it has been learned that the system is much more effective if a high level of vacuum is maintained during the process and accordingly, a vacuum tank or reservoir 40 is preferably employed, connected to cross-fitting 26 by a conduit 42.

The basic concept of tenderizing meat 16 within vessel 10 includes the steps of applying high vacuums the interior of the vessel and cycling the vacuum between a higher and a lower level. It has been learned that when the vacuum is rapidly cycled between a higher and lower level while meat 16 is in the presence of liquid 14, that the liquid rapidly enters and exits the meat, tearing down muscle and connective tissue to thereby tenderize the meat. To practice this method in its most simplified arrangement, vacuum pump 18 pumps a high vacuum such as approaching the maximum practically and economically attainable vacuum, such as 25 to 30 inches of mercury. Valve 30 is manually opened while valve 38 is closed to apply the vacuum to the interior of vessel 10 and thereby to meat 16. The application of the vacuum to the vessel and thereby to solution 14 causing pressure in the meat to be reduced and any entrained gases to pass out of the meat. After the high vacuum is applied for an elected length of time sufficient to act upon meat 16, valve 30 is closed and valve 38 is opened. This permits air to flow in through valve 38, conduit 36 and fitting 34 into the interior of vessel 10 to raise the pressure. The extent to which the pressure is raised, that is, the extent to which the vacuum in the vessel is reduced, depends on how much restriction is provide by valve 38 and how long it is opened. The method of the invention requires that the valve be opened sufficient to reduce the vacuum in vessel 10 to cause at least about 5 inches of mercury decrease from the maximum vacuum level.

The invention can be practiced manually in such a way by opening and closing valves 30 and 38 to sequentially subject the meat 16 to a variation in vacuum level to cause solution 14 to flow in and out of the meat to thereby deteriorate connective tissue and muscle and thus to tenderize the meat.

Figure 2:
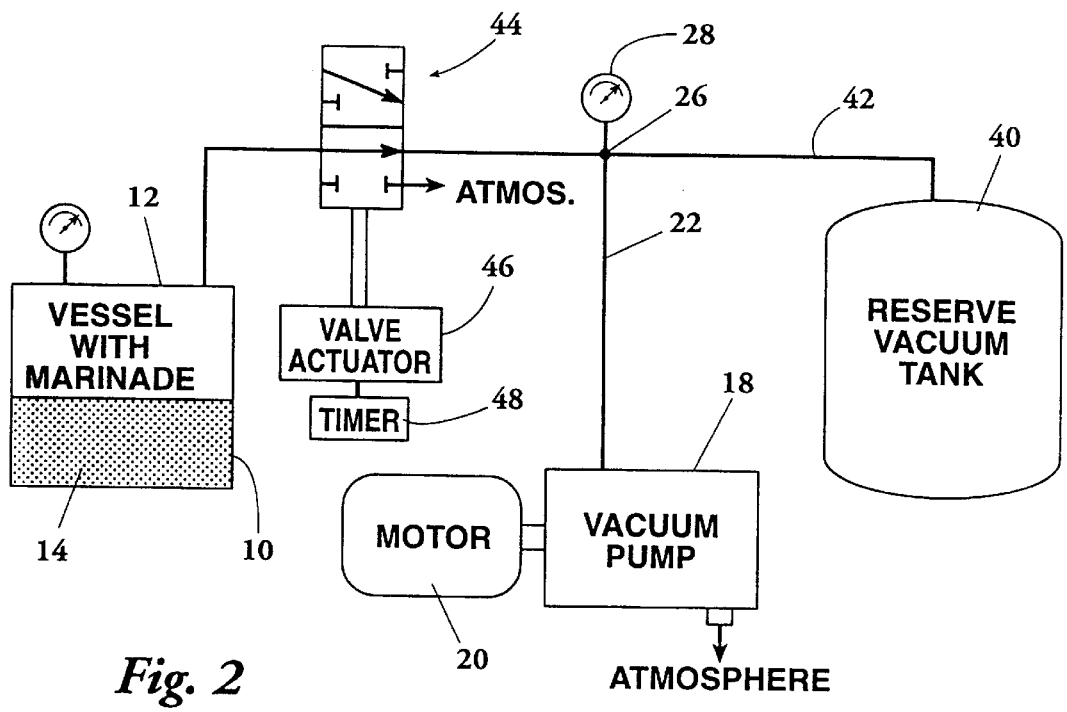
FIG. 2 is a diagrammatic view of a system as in FIG. 1 wherein manual valves are replaced by a controllable valve.
Figure 3:
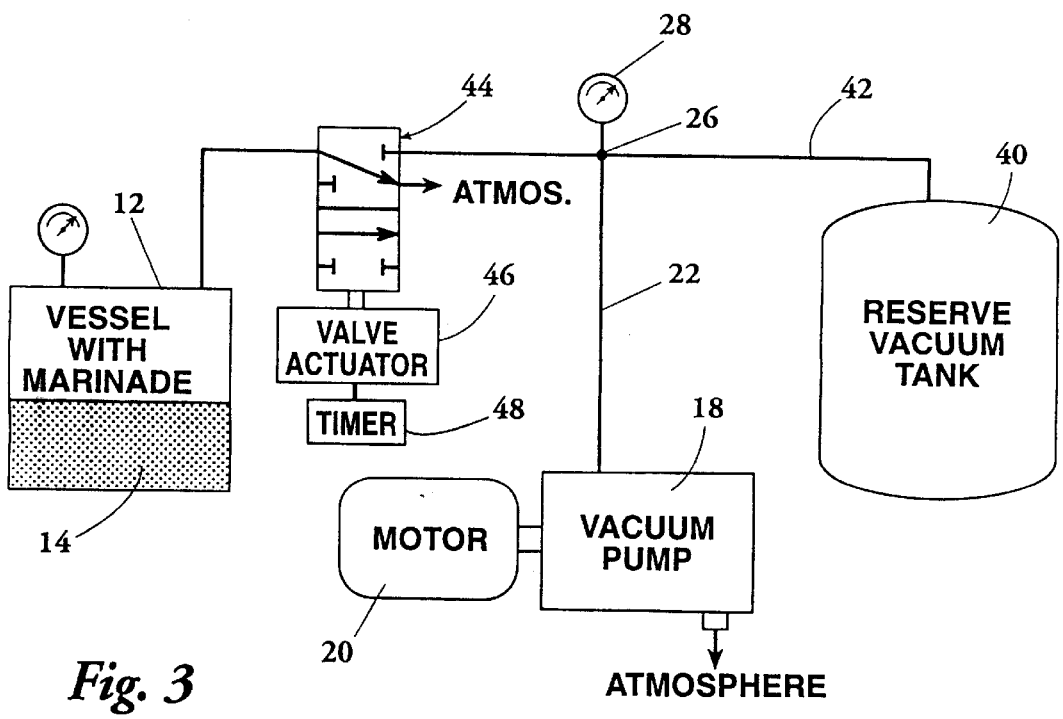
FIG. 3 is the same embodiment as FIG. 2 but showing the valve in the opposite position, that is, wherein the vessel having the meat therein is subjected to atmospheric pressure to reduce the vacuum in the vessel.

FIGS. 2 and 3 show an automated and more practical system. The only significant difference in FIGS. 2 and 3 compared to FIG. 1 is that in FIGS. 2 and 3, a two-position valve, indicated diagrammatically by numeral 44, is controlled by an actuator 46 which in turn is controlled by timer 48. Thus valve 44 takes the place of manual valves 30 and 38 of FIG. 1 to accomplish the same result.

FIG. 2 shows valve 44 in the first position wherein the interior of vessel 10 is connected to the source of vacuum, that is, to vacuum pump 18 and vacuum reservoir 40. After a selected length of time, determined by timer 48, actuator 46 moves valve 44 to the second position as illustrated in FIG. 3 wherein the interior of the vessel is connected to atmosphere. The level of vacuum within vessel 10 can be varied as rapidly as valve 44 is operated and the vacuum can be selected to be maintained between a selected high and a selected low vacuum level, each for a selected time.

FIGS. 2 and 3 do not show the meat within the vessel but it is understood that meat will be within the solution 14 in vessel 10. Further, check valve 24 is not employed. The actual plumbing connections required to practice the invention can vary considerably and such are not an important part of the invention but instead the invention is concerned only with the method of tenderizing meat, the apparatus being illustrated as the basic equipment employed in practicing the method.

Figure 4:
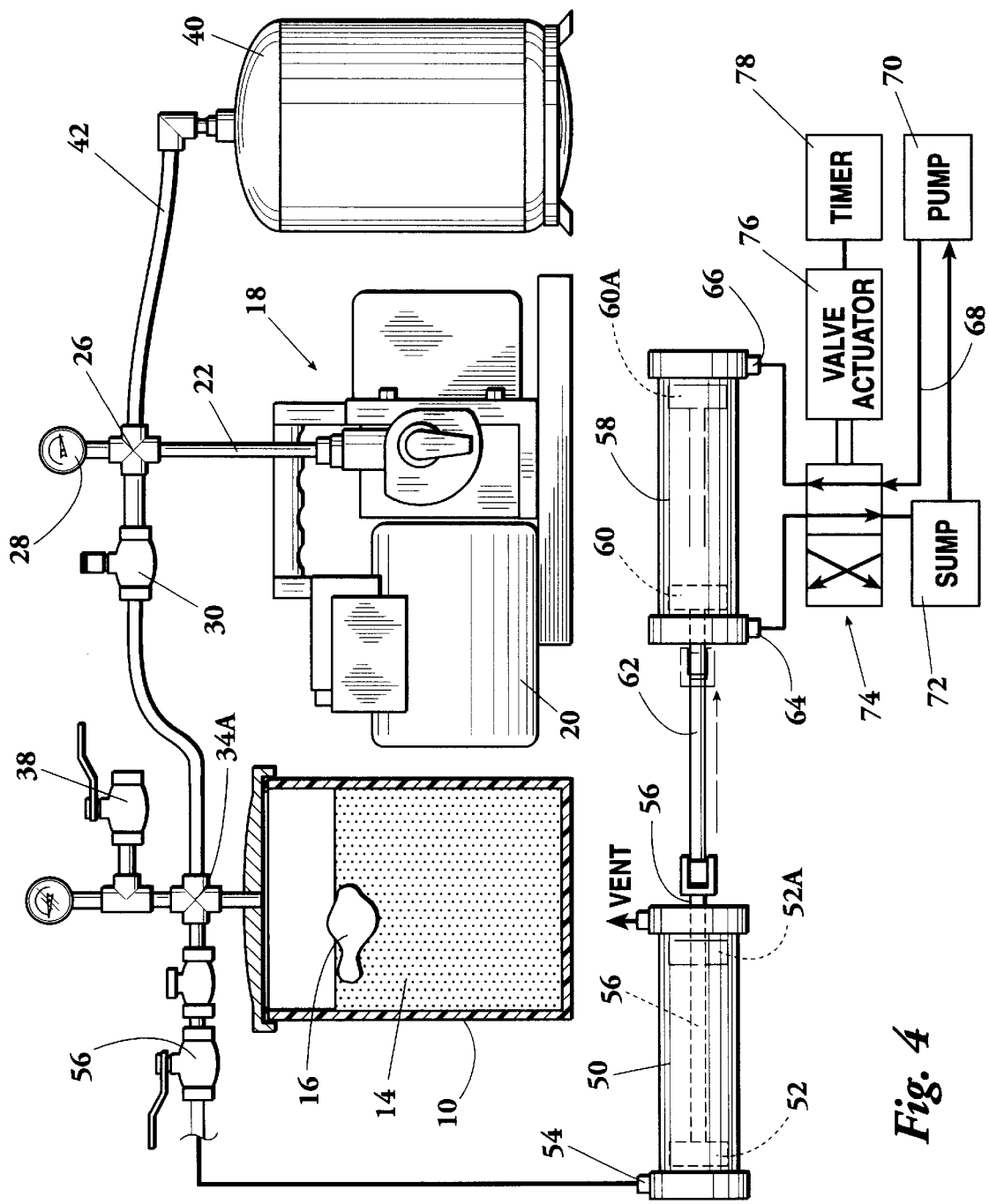
FIG. 4 is an illustration of an alternate embodiment of the invention, shown diagrammatically, a sealed liquid filled vessel having meat therein. The vessel is attached to a vacuum source including a vacuum pump and a vacuum reservoir. A piston operating in a cylinder is employed to rapidly vary the level of vacuum applied to the meat in the container. The rapid change in a high vacuum level serves to disrupt the meat, that is, causes it to undergo rapid internal and external pressure changes to breakdown excessive muscle and connective tissue.

FIG. 4 shows an alternate embodiment of the invention employing the basic elements described with reference to FIG. 1 and in addition discloses apparatus that can be used to rapidly vary the level of vacuum to which meat is subjected. A cylinder having a piston therein is indicated by the numeral 50. The piston, shown in dotted outline, is indicated by the numeral 52. Cylinder 50 has a first port 54 that is connected through a manual valve 56 and fitting 34A to the interior of vessel 10. The system depends upon a means of actuating the piston 52 within cylinder 50 so as to vary the level of vacuum within container 10. In the illustrated arrangement, piston 52, which has a shaft 56 connect to it, is reciprocated by an actuating cylinder 58 which, in turn, has a piston 60, the piston being seen in dotted outline. A shaft 62 connected to piston 60 extends sealably through an end wall of cylinder 58. Cylinder 58 has first and second ports 64 and 66 that are connected to a source of fluid pressure available at conduit 68 extending from pump 70. When pump 70 is actuated, hydraulic or pneumatic pressure is available on conduit 68. When the fluid is a liquid, a sump 72 is employed.

A two position valve 74 connects conduit 68 and sump 72 to actuating cylinder ports 64 and 66. In the first position of valve 74 as illustrated, fluid flows from conduit 68 to port 66 thereby forcing piston 70 to the left which in turn forces piston 52 in cylinder 50 to the left as illustrated. Fluid trapped between pistons 60 and the left end wall of cylinder 58 flows to sump 52 in the path illustrated. When valve 74 reverses position, fluid flow is reversed to force piston 60 to the right to the position illustrated by piston 60A which, in turn, moves piston 52 in cylinder 50 to position 52A. Valve 74 is controlled by actuator 76 in response to a timer 78.

To practice the method of the invention utilizing the apparatus illustrated diagrammatically in FIG. 4, a high vacuum is applied from pump 18 and reservoir 40 and through valve 30 to the interior of vessel 10, valve 38 connecting the vessel to the atmosphere being closed. After a high vacuum is applied, such as about 29 or 30 inches of mercury, that is preferably as high a vacuum as is economically and reasonably available, valve 30 is closed. Thereafter, pump 70 is actuated and timer 78 operating valve actuator 76 is energized to reciprocate piston 60 within actuating cylinder 58 which in turn reciprocates piston 52 in cylinder 50. As piston 52 is reciprocated, the effective volume of the interior of vessel 10 is changed. That is, the volume within the interior of vessel 10 is in parallel with the volume within cylinder 50 determined by the position of piston 52. With the piston 52 at the far left the combined volume of cylinder 50 and the interior of vessel 10 is at a minimum. When piston 52 is moved to the right as indicated by the numeral 52A, the combined volume of the interior of cylinder 50 and the interior of vessel 10 increases thereby effectively decreasing the vacuum level applied to the interior of the vessel. Thus, by reciprocating piston 52, the level of vacuum within vessel 10 is varied.

The system of FIG. 4 illustrates a mechanical means of rapidly varying a high vacuum level within vessel 10 without the necessity of communicating the interior of the vessel to the atmosphere. In a preferred method of practicing the invention, the meat to be tenderized is first subjected to the high vacuum and then the level of the vacuum rapidly varied to force fluid rapidly into and out of the meat to deteriorate connective tissue and muscle and thereby tenderize the meat. The length of time to which the meat must be subjected to a change of vacuum can be relatively short, such as about 5 seconds more or less. The vacuum level can be varied at a frequency of about 5 to about 25 cycles per minute.

The amount of change of the vacuum level from the higher to the lower level during the treating process can vary but preferably is at a relatively high vacuum and varied by at least about 5 inches of mercury. Thus, if the initial vacuum applied to the interior of the vessel is about 29 inches of mercury, when piston 52A is in the left hand position, the vacuum is preferably about 24 inches of mercury when piston 52 is in the right hand position (52A). This is by example only as the vacuum level could vary as much as 10 or 15 inches of mercury but it has been determined that the invention works most successfully at a relatively high vacuum level and a relatively rapid change in the level of vacuum.

The treatment process can be relatively short, that is, tenderization can occur within one or two minutes after the process is initiated since, if the vacuum is varied at a frequency at 20 cycles per minute, and the treatment lasts for 2 minutes, the meat is subjected to a total of 40 cycles of higher and lower vacuum levels meaning that fluid is forced into and out of the meat 40 times. The length of the treating process will vary substantially according to the type of meat. Poultry, particularly chicken, is relatively tender and requires relatively little tenderization. Certain cuts of steak can require substantially more tenderization and therefore will require subjecting the meat to a longer treatment process, sometimes up to as much as 5 minutes or longer.

In addition the method of cycling the level of vacuum rapidly can be included with other treatment steps. For instance, if the solution 14 includes an enzyme or other chemically active agents it is sometimes found desirable to maintain the vacuum at a steady state for an extended length of time, such as 30 minutes, to allow chemical treatment of the meat in the solution. Allowing a steady state of chemical treatment can be practiced before or after the mechanical tenderization steps of rapidly altering the vacuum level.

While the use of water in vessel 10 in which the meat is placed is sufficient to achieve tenderization using the processes heretofore described, liquid 14 can be a marinade as previously stated, and in addition, can include other constituents to enhance the flavor, quality or preservability of meat. For instance, liquid 14 in vessel 10 can include a preservative that is more effective distributed in the meat using the techniques of this disclosure. Or, liquid 14 may be oil or contain oil so that when meat 16 is treated the oil content is raised to improve the flavor of the meat. Another option is to include in liquid 14 constituents that at least partially extracts fat from the meat to provide meat ready for cooking that has a lower fat content.

In summary, liquid 14 can be or can include:
(a) water, if only tenderization is desired;
(b) a marinade to improve flavor;
(c) a bactericide to improve preservability;
(d) an enzyme to chemically assist in tenderization;
(e) oil to improve fat content of the meat to enhance flavor;
(f) a fat extractant to reduce the fat content of the meat; and
(g) any combination of (a) through (f).

The variation in the level of vacuum to which meat is subjected to obtain tenderization, improved marination or other benefits as has been set out herein can be achieved by changes in vacuum of as little as 5 inches of mercury. However, greater variations are normally desirable, that is, the greater the vacuum variation the greater will be the effect on the meat. Increased vacuum level variation increases the total amount of vacuum that is required in reservoir 40. That is, when the level of vacuum is significantly reduced when valve 44 is in the position shown in FIG. 3, more vacuum reserve to quickly restore the vacuum to a high level in container 12 when valve 44 is returned to the position shown in FIG. 2.

Stated another way, rapidly varying the vacuum applied to vessel 12 between 30 and 25 inches of mercury will tenderize meat. Varying the vacuum between 30 and 20 inches of mercury will more thoroughly and more quickly tenderize meat, however, this requires more vacuum reserve.

Therefore, the size of vacuum pump 18 and reserve tank 40 will depend on the size of vessel 12, the amount of liquid 14 in vessel 12, the vacuum differential used in the process, that is, how much the vacuum level varies from the selected high to the selected low vacuum level and the length of time variable vacuum is applied to the vessel.

The vacuum differential level applied to the meat determines the degree of tenderization, however, the rate of change of vacuum level is also very important. When the rate of change in the vacuum level increases the meat is tenderized more effectively and more quickly.

As meat is more effectively tenderized by subjecting it to high differential and rapid vacuum changes the meat is more effectively marinated and deeper penetration of the meat by liquid for other purposes is achieved since tearing muscle and connective tissues creates new areas for liquid penetration.

It is important to prevent liquid 14 from vessel 10 from entering vacuum pump 18. This can be achieved by the use of liquid traps, not shown in the drawings but commonly used in vacuum systems.

In some installations, it may be important to agitate liquid 14 and meat pieces 16 in vessel 10 during the treatment process. This can be done mechanically, by a stirring paddle (not shown). Another way of agitating liquid 14 is to connect conduit 36 to the bottom of vessel 10, in a way to prevent liquid escape, so that air entering the vessel when valve 38 is opened will cause turbulence in liquid 14.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A method of tenderizing meat having muscle and connective tissue therein comprising the steps of:
   (1) placing the meat in a vessel with liquid therein sufficient to substantially cover the meat,
   (2) subjecting the vessel to a vacuum level of at least about 24 inches of mercury;
   (3) cycling the level of vacuum applied to the vessel at a predetermine rate through a range of at least about 5 inches of mercury;
   (4) continuing step (3) for a duration sufficient to deteriorate the muscle and connective tissue to obtain a desired meat tenderness.

2. The method of tenderizing meat according to claim 1 wherein, in step (2) the vessel is subjected to a vacuum of about 29 inches of mercury.

3. The method of tenderizing meat according to claim 1 wherein in step (3) the level of vacuum is cycled at a rate from about 6 to about 20 cycles per minute.

4. The method of tenderizing meat according to claim 3 in which step (3) is continued for a duration from about 10 seconds to about 2 minutes.

5. The method of tenderizing meat according to claim 1 in which said liquid is a taste enhancing liquid.

6. The method of tenderizing meat according to claim 5 including the step of maintaining a selected pressure within said vessel at a steady state for a selected length of time to permit a chemical reaction between the meat and the liquid.

7. The method of tenderizing meat according to claim 6 in which said selected length of time at which the pressure remains steady is from about 5 to about 45 minutes.

8. The method of tenderizing meat according to claim 1 in which said liquid is chemically reactive with meat.

9. The method of tenderizing meat according to claim 8 in which said liquid is chemically reactive with meat to enhance tenderization of the meat.

10. A method of tenderizing meat comprising the steps of submerging the meat in a liquid and while submerged subjecting the meat to a preselected vacuum and cycling the vacuum through a preselected rate within a range of about 5 inches of mercury for a preselected time sufficient to physically degrade the meat to obtain desired tenderness.

11. The method of tenderizing meat according to claim 10 wherein said preselected vacuum of about 29 inches of mercury.

12. The method of tenderizing meat according to claim 10 wherein said vacuum is cycled at a rate from about 6 to about 20 cycles per minute.

13. The method of tenderizing meat according to claim 12 in which said vacuum is cycled for a duration from about 10 seconds to about 2 minutes.

14. The method of tenderizing meat according to claim 10 in which the meat is in a liquid medium that includes a taste enhancing ingredient.

15. The method of tenderizing meat according to claim 14 including the step of maintaining a selected vacuum at a substantially steady state for a selected length of time to permit a chemical reaction between the meat and a chemical constituent contained in a liquid medium in which the meat is positioned.

16. The method of tenderizing meat according to claim 15 in which said selected length of time at which said vacuum remains substantially steady is from about 5 to about 45 minutes.

17. The method of tenderizing meat according to claim 10 in which the meat is positioned in a liquid that is chemically reactive with the meat.

18. The method of tenderizing meat according to claim 17 in which said liquid chemically enhances tenderization of the meat.

19. The method of tenderizing meat according to claim 10 in which the steps are carried out in a vessel having a removable and sealable top, the vessel having a liquid medium, therein into which the meat is positioned and having an air passage port, employing a vacuum pump and a reserve vacuum tank connected to the vacuum pump and a two position valve connected to said vessel air passage port, in a first position of the valve communication is provided between said vessel air passage port and ambient atmospheric pressure and in a second position of the valve communication is provided between said vessel air passage port and said reserve tank, said valve being cycled between said first and second positions, in said second position said preselected vacuum being applied to said vessel to cause meat positioned therein to expand and in said first position ambient atmospheric pressure is applied to said vessel to cause the meat to collapse.

20. The method for tenderizing meat according to claim 19 wherein said preselected vacuum when said valve is in said second position is about 29 inches of mercury.

21. The method fro tenderizing meat according to claim 19 wherein said valve is cycled a plurality of times and wherein said valve is in said second position for about 5 seconds per cycle.

22. The method for tenderizing meat according to claim 19 wherein said valve is cycled between said first and second positions at a rate of about 6 to about 20 cycles per minute.

23. The method for tenderizing meat according to claim 19 including separate means for pulsating said vacuum when said valve is in said second position.

24. The method for tenderizing meat according to claim 10 in which the steps are carried out in a vessel having a removable sealable top, the vessel having a liquid medium therein into which the meat is placed and having an air passageway port, employing a cylinder having a piston therein and a port communicating with the cylinder, and means for selectably communicating said cylinder port with said vessel air passageway port, including means for applying vacuum and for sequentially reciprocating said piston, so that when the meat is subjected to said vacuum, said piston is reciprocated to vary said vacuum through said preselected range.

25. The method for tenderizing meat according to claim 24 wherein said means for applying vacuum to said vessel includes a vacuum pump.

26. The method for tenderizing meat according to claim 24 wherein said means for sequentially reciprocating said piston includes an actuating cylinder having an actuating piston therein, a piston rod connecting said actuating piston to a vacuum piston, and means for sequentially pressurizing said actuating cylinder.

27. The method for tenderizing meat according to claim 24 wherein said liquid in said vessel is a marinade whereby the meat is simultaneously tenderized and marinated.

* * * * *